United States Patent [19]

Sheehan

[11] 4,366,344
[45] Dec. 28, 1982

[54] CONNECTOR FOR A HELICALLY GROOVED ELECTRICAL CONDUCTOR

[76] Inventor: Robert K. Sheehan, 571 Rolling Rock La., Cincinnati, Ohio 45230

[21] Appl. No.: 159,156

[22] Filed: Jun. 13, 1980

[51] Int. Cl.³ .................. H02G 3/18; H02G 13/18; B23P 11/02
[52] U.S. Cl. .................... 174/65 R; 29/453; 29/526 R; 339/128
[58] Field of Search .............. 29/453, 526 R; 113/120 E; 339/128; 174/51, 65 R

[56] References Cited

U.S. PATENT DOCUMENTS

| | | | |
|---|---|---|---|
| 1,689,097 | 10/1928 | Wright | 113/120 E |
| 1,928,761 | 10/1933 | Newman et al. | 174/65 R UX |
| 2,033,809 | 3/1936 | Beck | 113/120 E |
| 3,183,297 | 5/1965 | Curtiss | 174/51 X |
| 3,340,497 | 9/1967 | Balint | 339/128 X |
| 3,858,151 | 12/1974 | Paskert | 174/51 X |
| 4,012,578 | 3/1977 | Moran et al. | 174/51 |
| 4,021,604 | 5/1977 | Dola et al. | 174/51 |

FOREIGN PATENT DOCUMENTS 808897 2/1959 United Kingdom ............ 174/65 R

*Primary Examiner*—Charlie T. Moon
*Attorney, Agent, or Firm*—Wood, Herron & Evans

[57] ABSTRACT

A connector for mounting a helically grooved conductor onto a junction box or the like. The connector is U-shaped and presents three inwardly directed tabs and two barbed fasteners. The conductor is side loaded, or laid into the connector with the tabs becoming lodged in the helical grooves to prevent longitudinal withdrawal. The fasteners are snapped into a hole in a wall to secure the connector with the conductor to the wall.

6 Claims, 4 Drawing Figures

U.S. Patent   Dec. 28, 1982   4,366,344
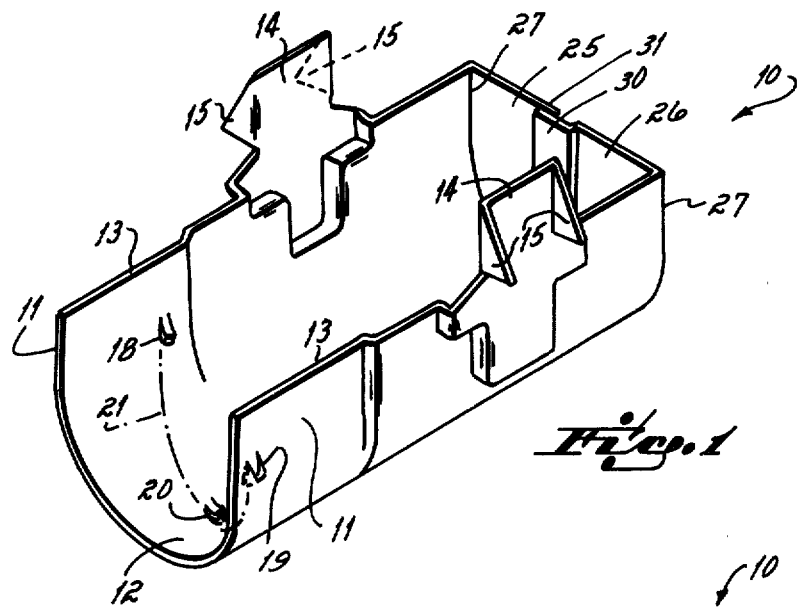
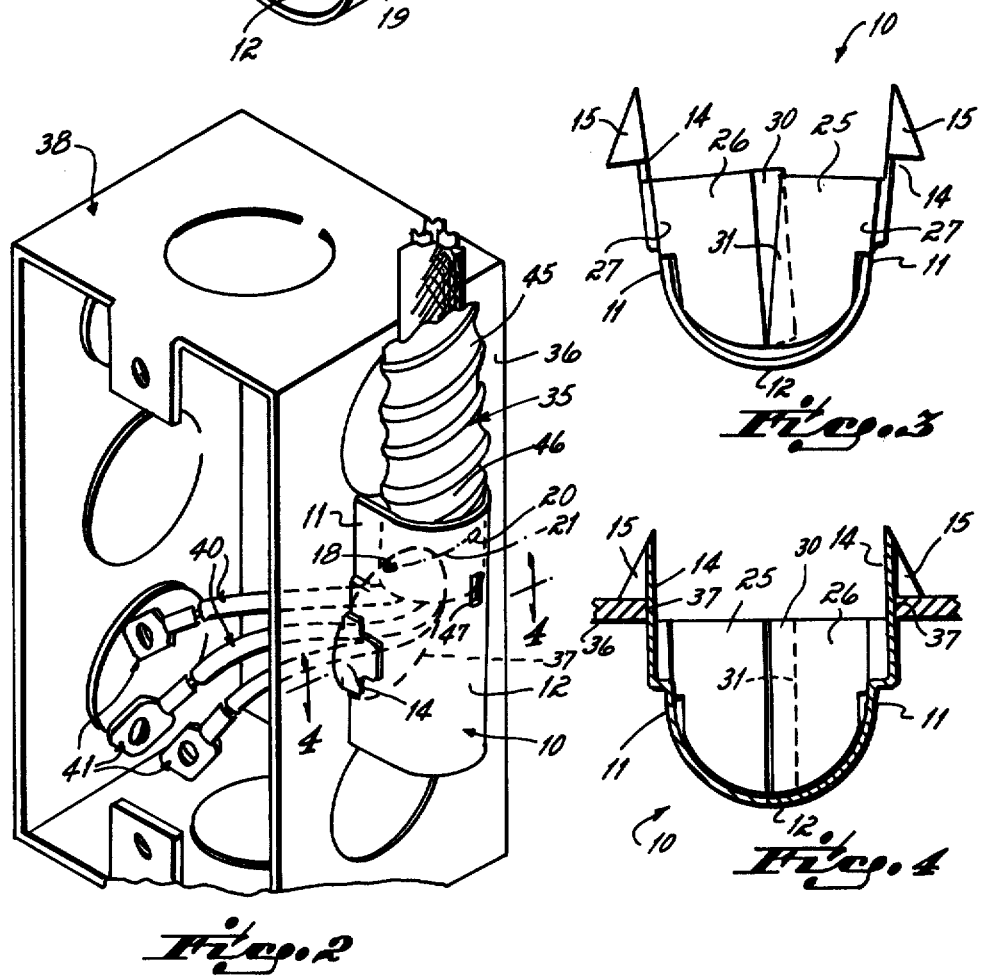

CONNECTOR FOR A HELICALLY GROOVED ELECTRICAL CONDUCTOR

This invention relates to a connector for a helically grooved electrical conductor by which the conductor is secured to a junction box or similar device having a hole in it through which the electrical conductors pass for connection to electrical terminals.

At the present time, the major portion of the connectors for helically grooved electrical conductors are die cast assemblies. The die cast assembly has several parts. It has a body which is inserted into a hole in a junction box and is threaded so that a nut, on the inside of the junction box, can be threaded onto it to secure it tightly to the junction box wall. It has a cap which, with two screws, is secured to the body member so as to clamp the conduit between the body and the cap.

This connector requires time and some patience to apply. The screws on the cap must be backed substantially all the way out so as to space the body and cap apart a distance sufficient to receive the conduit. Then they must be screwed tightly in to clamp the conduit between the body and the cap. Projecting electrical conductors must then be threaded into the junction box and the nut must be threaded over them and then tightened against the wall of the junction box without a great deal of room to maneuver in.

A different approach is disclosed in U.S. Pat. No. 4,021,604. There, a one-piece metal stamping surrounded by a plastic block is adapted to receive the helical conduit. The assembly has projecting fasteners which are snapped into the opening of the junction box to secure the connector with its conduit to the wall of the junction box. The metal stamping has a hole in one end into which the helical conduit is threaded so as to secure it to the connector.

An objective of the present invention has been to provide a connector which is an improvement in the die cast connector and is an improvement in the connector of the type disclosed in the '604 patent in at least the following respects.

(a) The connector is less expensive to manufacture.
(b) It is easier to apply in the field.
(c) It will accommodate wide variations in the outside dimension of the helical conduit.
(d) It will receive a conduit with any size of terminations on the ends of the electrical conductors without the necessity of threading them or passing them through an opening in the connector.

These objectives of the invention are attained by providing a connector which is elongated and is generally U-shaped in configuration having a pair of legs and a bight portion, the legs having barbed fasteners projecting from them. Three retaining tabs are struck inwardly from the legs and bight portion, the tabs being engageable with the grooves or convolutions in the helical conduit to restrain the conduit from pulling longitudinally out of the connector. A conduit can simply be laid into the U-shaped connector without having to be threaded through an end opening therein. This side loading feature permits a snapping-in of the helical conduit with a considerable saving in time and trouble.

Since the conduit is simply laid into the U-shaped connector, there are no restrictions on the size or configuration of the terminations at the ends of the electrical conductors which can be employed. That is to say, such terminations do not have to be threaded through an opening of a given size.

The connector preferably has slightly diverging legs so as to receive a conduit of any diameter, within limits, the legs swinging to parallel when the connector is snapped into a hole in a wall. Finally, the legs have end wall members at one end to close off the connector when it has been applied to a wall.

The several objectives and features of the invention will become more readily apparent from the following detailed description taken in conjunction with the accompanying drawings in which:

FIG. 1 is a perspective view of the connector of the present invention;

FIG. 2 is a perspective view of the connector and a helically grooved conduit applied to a junction box;

FIG. 3 is an end view of the connector of FIG. 1; and

FIG. 4 is a cross-sectional view taken along lines 4—4 of FIG. 2.

Referring to FIG. 1, the connector of the present invention is indicated at 10 and consists of a sheet metal stamping formed from one piece of sheet metal. In practice, the connector is formed from a ribbon of sheet metal which is fed through a sequence of stamping dies until it attains the configuration of FIG. 1.

The connector is elongated and generally U-shaped in transverse cross section presenting legs 11 and a bight portion 12. The legs have edges 13 from which project fasteners 14 each having a pair of barbs 15 by which they are retained on a junction box or other sheet metal surface having a hole in it, as will be described.

The connector has at least one and preferably three inwardly-projecting tabs 18, 19 and 20 struck from the legs and bight portion, respectively. The tabs 18, 19 and 20 are longitudinally staggered so that a line through them, indicated by the phantom line 21, forms a portion of a helix matching the helical groove in the conduit to be received in the connector.

A pair of end walls 25 and 26 are integrally connected at 27 to the legs 11 of the connector at one end thereof. One of the walls 26 has an offset edge portion 30 which the edge portion 31 of the opposed wall 25 overlies.

The connector is preferably formed of a high grade of spring steel and is normally in a slightly open attitude as indicated in FIG. 3, with the legs 11 slightly diverging.

The connector 10 is designed to mount a helically grooved electrical conductor 35 onto a sheet metal wall 36 having a hole 37 in it. In the illustrated form of the invention, the sheet metal wall 36 forms a part of a junction box 38. Within the junction box 38, the electrical conductor 35 presents leads 40 which will be attached to other electrical conductors or to electrical devices to which current, through the electrical conductor, is fed. The leads 40 may be provided with circular terminations 41 or other types of terminations which are of substantial size and adapted to be screwed onto or plugged onto an electrical device to which the electrical conductor is to be connected.

The electrical conductor has a flexible metal shield 45 having a helical groove 46 whose helix generally matches the imaginary helical line 21 formed by the projecting tabs 18, 19 and 20. The metallic shield is conventionally terminated in a hollow, red plug which provides protection against any roughened edges of the metal shield. The bight portion of the connector has a small hole 47 through which the red plug is visible so that upon inspection it can be seen that the metal shield has projected far enough into the connector.

In use, the helically grooved electrical conductor is simply laid transversely (side-loaded) into the connector with the red plug generally aligned with the opening 47. When so positioned, the inwardly-projecting tabs 18, 19 and 20 lodge themselves in the helical groove 46 so as to prevent axial withdrawal of the electrical conductor with respect to the connector 10.

With the conductor lying in the U-shaped connector, the conductor leads 40 are inserted in the hole 37 in the junction box wall and the barbed fasteners 14 are inserted in the hole 37 as shown in FIG. 4. The barbs cam the connector closed on the conductor and then snap into a position underlying the wall to retain the connector and the electrical conductor securely in position against the wall of the junction box.

Because the conductor is simply laid transversely into the connector, there is no requirement of threading the large terminations 41 through a hole in the connector. Further, because of the U-shaped configuration, it does not matter if the conductor is slightly larger or slightly smaller than the preferred diameter, for when the connector is applied to the wall with the barbed fasteners snapped through the hole 37 in the wall, the connector will clamp down on the electrical conductor and retain it securely against the wall.

Finally, the use of spring steel prevents the connector from loosening because of any vibration in the equipment to which the conductor is mounted.

Having described my invention, I claim:

1. A connector for mounting an electrical conductor surrounded by a helically grooved metallic shield to a junction box having a wall and a hole in said wall through which electrical conductors pass comprising,
   a one-piece sheet metal member,
   said member being elongated and having a U-shaped cross section including two legs and a semi-cylindrical bight portion,
   said legs presenting longitudinal parallel edges engageable with said junction box wall and end edges extending perpendicular to said longitudinal edges,
   an inwardly-projecting tab on each said leg intermediate the ends of said member and longitudinally spaced from each other and engageable in a helical groove of said shield to retain said shield against longitudinal movement with respect to said connector,
   a barbed fastener projecting from the longitudinal edges of each leg and adapted to be inserted in said hole to retain said connector on said junction box wall,
   each barbed fastener being spaced only a slight distance from said longitudinal edge so said longitudinal edge will lie against said junction box wall when said barbs project through said hole therein,
   each leg having a flap projecting transversely from an end edge of said leg across one end of said member to form an end wall for each member,
   whereby said shield may be laid in said connector and held by said tabs, said connector thereafter being mounted on said junction box wall by inserting said fasteners in said hole.

2. A connector as in claim 1 in which said connector has an inwardly-projecting tab on each of said legs and bight portion, respectively, said tabs being longitudinally staggered on a generally helical line for engagement with said helical groove.

3. The connector as in claim 1 in which said legs of said connector are slightly diverging prior to insertion into the hole in the wall.

4. A connector as in claim 1 in which one said flap has an offset edge portion which overlaps the other of said flaps.

5. A connector as in claim 1 further comprising a small hole in the central portion of said bight portion through which the end portion of said shield is visible.

6. A connector for mounting an electrical conductor surrounded by a helically grooved metallic shield to a junction box having a wall and a hole in said wall through which electrical conductors pass comprising.
   a one-piece sheet metal member,
   said member being elongated and having a U-shaped cross section including two legs and a semi-cylindrical bight portion,
   said legs presenting longitudinal parallel edges engageable with said junction box wall and end edges extending perpendicular to said longitudinal edges,
   an inwardly-projecting tab on each of said legs and bight portion, respectively, said tabs being located intermediate the ends of said member and being longitudinally staggered in a generally helical line for engagement with said helical groove, said tabs retaining said shield against longitudinal movement with respect to said conductor,
   a barbed fastener projecting from the longitudinal edges of each leg and adapted to be inserted in said hole to retain said connector on said junction box wall,
   each barbed fastener being spaced only a slight distance from said longitudinal edge so said longitudinal edge will lie against said junction box wall when said barbs project through said hole therein,
   each leg having a flap projecting transversely from an end edge of said leg across one end of said member to form an end wall for said member,
   one of said flaps having an offset edge portion which overlaps the other of said flaps,
   whereby said shield may be laid in said connector and held by said tabs, said connector thereafter being mounted on said junction box wall by inserting said fasteners in said hole.

* * * * *